US007751803B2

(12) United States Patent
Vialen et al.

(10) Patent No.: US 7,751,803 B2
(45) Date of Patent: Jul. 6, 2010

(54) METHOD AND ARRANGEMENT FOR OPTIMIZING THE RE-ESTABLISHMENT OF CONNECTIONS IN A CELLULAR RADIO SYSTEM SUPPORTING REAL TIME AND NON-REAL TIME COMMUNICATIONS (75) Inventors: Jukka Vialen, Espoo (FI); Jaakko Rajaniemi, Helsinki (FI); Serge Haumont, Helsinki (FI)

(73) Assignee: Nokia Corporation, Espoo (FI)

( * ) Notice: Subject to any disclaimer, the term of this patent is extended or adjusted under 35 U.S.C. 154(b) by 1805 days.

(21) Appl. No.: 09/790,469

(22) Filed: Feb. 22, 2001

(65) Prior Publication Data

US 2001/0018342 A1 Aug. 30, 2001

(30) Foreign Application Priority Data

Feb. 24, 2000 (FI) .................................. 20000438
Mar. 24, 2000 (FI) .................................. 20000701

(51) Int. Cl.
*H04B 7/00* (2006.01)
*H04J 3/24* (2006.01)
*H04Q 7/20* (2006.01)
(52) U.S. Cl. ................. 455/414.1; 455/422.1; 455/442; 455/462; 455/466; 455/405; 370/350; 370/280; 370/441; 379/210.01; 379/215.01
(58) Field of Classification Search ................. 455/423, 455/466, 450, 422.1, 418, 564, 405, 458, 455/557, 414.1, 442, 462; 370/208, 441, 370/350, 280; 379/210.01, 215.01
See application file for complete search history.

(56) References Cited

U.S. PATENT DOCUMENTS 4,837,800 A * 6/1989 Freeburg et al. ............ 455/557

5,175,758 A * 12/1992 Levanto et al. .............. 455/458
5,239,571 A * 8/1993 Takahashi ................... 455/564
5,280,541 A * 1/1994 Marko et al. ................ 455/462
5,394,391 A * 2/1995 Chen et al. .................. 370/441
5,410,591 A * 4/1995 Takahashi .............. 379/215.01
5,546,382 A * 8/1996 Fujino ........................ 455/405

(Continued)

FOREIGN PATENT DOCUMENTS

EP 0872982 A1 10/1998

(Continued)

OTHER PUBLICATIONS

Technical Specification, 3GPP TS 25.331, 2000, v3.5.0, relevant pages thereof.

(Continued)

*Primary Examiner*—William D Cumming
(74) *Attorney, Agent, or Firm*—Perman & Green, LLP (57) ABSTRACT A method and arrangement for determining the expiry time for a period during which the re-establishment of lost radio bearers is allowable. There is determined a first expiry time (206, 207) for a period during which the re-establishment of lost radio bearers used to provide services of a first category, like real time services, is allowable. Additionally there is determined a second expiry time (208, 209) for a period during which the re-establishment of lost radio bearers used to provide services of a second category, like non-real time services, is allowable.

27 Claims, 6 Drawing Sheets

U.S. PATENT DOCUMENTS

| | | | | |
|---|---|---|---|---|
| 5,566,236 | A * | 10/1996 | MeLampy et al. | 379/210.01 |
| 5,797,085 | A | 8/1998 | Beuk et al. | 455/88 |
| 5,818,820 | A * | 10/1998 | Anderson et al. | 370/280 |
| 5,974,310 | A | 10/1999 | Bilgic | |
| 6,032,040 | A * | 2/2000 | Choy et al. | 455/414.1 |
| 6,094,575 | A * | 7/2000 | Anderson et al. | 455/422.1 |
| 6,215,782 | B1 * | 4/2001 | Buskens et al. | 370/350 |
| 6,249,681 | B1 * | 6/2001 | Virtanen | 455/466 |
| 6,256,492 | B1 * | 7/2001 | Bilgic | 455/418 |
| 6,343,216 | B1 * | 1/2002 | Kim et al. | 455/450 |
| 6,501,947 | B1 * | 12/2002 | Hunzinger et al. | 455/414.1 |
| 6,633,760 | B1 * | 10/2003 | Ham et al. | 455/422.1 |
| 6,754,498 | B2 * | 6/2004 | Chun et al. | 445/442 |

FOREIGN PATENT DOCUMENTS

| | | |
|---|---|---|
| JP | 10089980 A | 4/1998 |
| WO | WO 95/08903 | 3/1995 |
| WO | 9713353 | 4/1997 |
| WO | 99/14973 A2 | 3/1999 |
| WO | 99/55022 A1 | 10/1999 |
| WO | 9955022 A1 | 10/1999 |
| WO | WO 99/55022 | 10/1999 |
| WO | 00/01173 A1 | 1/2000 |
| WO | 0001173 A1 | 1/2000 |
| WO | WO 00/01173 | 1/2000 |
| WO | 0033595 A1 | 6/2000 |

OTHER PUBLICATIONS

Technical Specification, 3GPP TS 25.302, 2000, v3.7.0.
Technical Specification, 3GPP TS 25.321, 2000, v3.6.0.
Technical Specification, 3GPP TS 25.322, 2000, v3.5.0.
Proposal of a parameter for RRC Connection Re-establishment, TSGR2#7(99)a53 (based on R2-99784), TSG-RAN Working Group 2 meeting #7; Malmo, Sweden Sep. 20-24, 1999.
Proposed Cr 008 to 25.331 on a parameter for RRC Connection Re-establishment, TSGR2#7(99)e50, (Based on R2-99a53), TSG-RAN Working Group 2 meeting #8; Cheju, Korea Oct. 2-5, 1999.
Report on email discussion on Rrc connection re-establishment, TSGR2#9(99)i26, Tsg-Ran Working Group 2 meeting #9, Sophia Antipolis, France, 29 Nov.-3 Dec. 1999. .
Proposed CR 059 to 25.331 on a parameter for RRC Connection Re-establishment, TSGR2#9(99)h87, (Based on R2-99e50), TSG-RAN Working Group 2 meeting #9, Sophia Antipolis, France Nov. 29 - Dec. 3, 1999.
3G Ts 25.331 V3.0.0, Oct. 1999.
Proposed CR 060 to 25.331 on a timer for RRC Connection Re-establishment, TSGR2#9(99)h88, TSG-RAN Working Group 2 meeting #9, Sophia Antipolis, France Nov. 29 - Dec. 3, 1999.
3G TS 25.331 V3.1.0, Jan. 2000.
Draft ETSI EN 300 940 V6.8.0 (available from Feb. 16, 2000).
Draft GSM 05.08 V8.2.0, Dec. 1999.
GSM 04.18 V8.2.0, Dec. 1999.
Upper Layer (Layer 3) Signaling Standard for cdma2000 Spread Spectrum Systems, 3GPP2 C.S0005-0 Version 1.0, Version Date: Jul. 1999.
Proposed CR 135 to 25.331 on parameter for RRC Connection Re-establishment, TSGR2#10 (00)0083. TSG-RAN Working Group 2 meeting #10, San Diego, USA Jan. 17-21, 2000.
LS on RRC Connection Re-establishment mechanism, TSG-RAN Working Group 2 (Radio layer 2 and Radio layer 3) R2-00281, San Diego, CA, USA, January 17-21, 2000.

* cited by examiner

METHOD AND ARRANGEMENT FOR OPTIMIZING THE RE-ESTABLISHMENT OF CONNECTIONS IN A CELLULAR RADIO SYSTEM SUPPORTING REAL TIME AND NON-REAL TIME COMMUNICATIONS

TECHNOLOGICAL FIELD

The invention concerns generally the technology of re-establishing a lost radio connection between a mobile terminal and a base station in cellular radio systems. Especially the invention concerns the technology of optimizing the re-establishment procedure so that it takes into account the real time or non-real time nature of services provided through the radio bearers.

BACKGROUND OF THE INVENTION

Wireless communications systems refer generally to any telecommunications system which enables wireless communication between its users and a network. In mobile communications systems users are capable of moving within the coverage area of the network. A mobile communications network can be divided into two main parts, which are the radio access network and the core network. Examples of radio access networks are GSM (Global System for Mobile telecommunications) and its enhancements EDGE (Enhanced Data rates for GSM Evolution), GPRS (General Packet Radio Service), GERAN (GPRS EDGE Radio Access Network) which is a GSM/GPRS based 3rd generation radio network, IS-95 (Interim Standard), DS-41, cdma2000 (code division multiple access), WCDMA UTRAN (Wideband CDMA UMTS Terrestrial Radio Access Network; Universal Mobile Telecommunications System). Examples of core networks are: GSM, GPRS, IS-41 (also called ANSI-41) and the 3rd generation evolutions of these core networks.

The current trend in standardization is to find possibilities to connect one radio access network to various core network types and vice versa. One good example of this kind of activity is the 3GPP specification work where WCDMA UTRAN connectivity will be specified to both GSM-based (incl. GPRS) and IS-41 based core networks. The present invention can be used in different mobile communications systems and is not limited to any particular radio access network or core network. In the following, the invention is described by way of example with reference to UMTS, more specifically to the UMTS system being specified in the 3rd generation partnership project 3GPP, without restricting the invention to it.

The specifications of many second generation and most third generation cellular radio systems give support for establishing real time (RT) and non-real time (NRT) services between mobile terminals and base stations. RT services are used for time-critical applications like speech and real time video, while NRT applications usually convey data like e-mails or downloaded files. It is characteristic to RT services that a user (be it a human user or a process) notices immediately if there are inappropriate delays or breaks in the radio bearer through which the service is provided.

In cellular radio systems it often happens that a radio connection between a user terminal and a serving base station is temporarily lost due to interference or unfavorable signal propagation conditions. In most cellular radio systems there have been determined arrangements for re-establishing lost connections rapidly so that the incident might pass unnoticed to the user or at least the inconvenience caused would be as small as possible. As an example we will consider the re-establishment procedures defined for RRC (Radio Resource Control) connections in the 3GPP (Third Generation Partnership Project) specification numbers TS25.331, TS25.302, TS25.321 and TS25.322 which are published by the ETSI (European Telecommunications Standard Institute) and incorporated herein by reference.

According to said prior art document, when a mobile terminal (or a UE; user equipment) loses the radio connection due to e.g. radio link failure while it is in a so-called CELL_DCH state, the mobile terminal may initiate a new cell selection by transiting into a so-called CELL_FACH state and requesting re-establishment of an RRC connection. The acronyms DCH and FACH come from Dedicated CHannel and Forward Access CHannel and said states are characterized by that the mobile terminal uses primarily these channels. After having detected the loss of a radio connection the mobile terminal starts a timer which in said prior art document is referred to as the timer T314, or the 're-establishment' timer. If the mobile terminal finds itself to be within an "in service area", where connection re-establishment is possible, it stops the timer T314 and transmits a message known as the RRC CONNECTION RE_ESTABLISHMENT REQUEST on the uplink CCCH or Common Control CHannel. However, if the timer T314 makes it to expiry before the mobile terminal finds itself to be within an "in service area", the mobile terminal must enter an RRC-idle mode where active communication with base stations is not possible.

The value of the timer T314 may be anything between 0 and 4095 seconds. An RNC (Radio Network Controller) sets the timer value and sends it to the mobile terminal in some dedicated control message like the known RRC Connection Setup, Radio Bearer Setup, Radio Bearer Release, Radio Bearer Reconfiguration, Transport channel reconfiguration, Physical Channel Reconfiguration and RRC Connection Re-establishment messages. In other words, the timer value may be specific to the mobile terminal in question and it may even be changed during a RRC connection, depending e.g. on the current service configuration of the mobile terminal.

The problem with the prior art arrangement is its inflexibility regarding different types of services, e.g. real time vs. non-real time services. Due to its nature an RT connection does not tolerate long delays or breaks, so a relatively small value, in the order of seconds, should be selected for the expiry of the timer T314 (or other timer used for a similar purpose). It should even be possible to "turn off" the re-establishment possibility for RT bearers, meaning that if UE loses the radio connection, the RT bearers are released (locally in UE and in UTRAN) immediately. On the other hand NRT connections are much more tolerable and could withstand temporary delays in the order of minutes or even tens of minutes. If the mobile terminal has active radio bearers related both to real time and non-real time connections in use at the moment of radio link failure, at least one of these suffers from an inadequately selected expiry value for the re-establishment timer.

In addition to the real time/non-real time division it is possible to group the services conveyed over radio bearers into other kinds of groups that also have different requirements regarding the timing of connection re-establishment.

SUMMARY OF THE INVENTION

It is an object of the present invention to provide a method and an arrangement for enabling connection re-establishment so that it takes into account the requirements of different types of services.

The objects of the invention are achieved by defining separate timers or some higher layer monitoring arrangements for controlling the reestablishment period of radio bearers of different kinds.

The method according to the invention is, in its first aspect, characterized in that it comprises the steps of:
  determining a first expiry time for a period during which the re-establishment of the lost radio connection in respect of radio bearers used to provide a service or services of a first category is allowable and
  determining a second expiry time for a period during which the re-establishment of the lost radio connection in respect of radio bearers used to provide a service or services of a second category is allowable.

In its second aspect the invention concerns a method for responding to a situation where a mobile station of a cellular radio network detects a failure in a radio connection between itself and a network node of the cellular radio network, comprising the steps of a) starting a first timer, b) checking, whether the mobile station is within an in service area and c) as a response to the mobile station being within an in service area, initiating the re-establishment of the radio connection;

it is characteristic to the method according to this aspect of the invention that it comprises the steps of:

a') starting a second timer, d') as a response to the first timer reaching a first expiry value without the mobile station finding itself to be within an in service area, disabling the re-establishment of the radio connection in respect of radio bearers used to provide a service or services of a first category and d") as a response to said second timer reaching a second expiry value without the mobile station finding itself to be within an in service area, disabling the re-establishment of the radio connection in respect of radio bearers used to provide a service or services of a second category.

In its third aspect the invention concerns a method for responding to a situation where a network node of a cellular radio network detects a failure in a radio connection between itself and a mobile station of the cellular radio network, comprising the steps of a) starting a first timer, b) checking, whether a connection re-establishment request has been received from the mobile station and c) as a response to a connection re-establishment request having been received from the mobile station, initiating the re-establishment of the radio connection;

it is characteristic to the method according to this aspect of the invention that it comprises the steps of:

a') starting a second timer, d') as a response to the first timer reaching a first expiry value without a connection re-establishment request having been received from the mobile station, disabling the re-establishment of the radio connection in respect of radio bearers used to provide a service or services of a first category and d") as a response to said second timer reaching a second expiry value without a connection re-establishment request having been received from the mobile station, disabling the re-establishment of the radio connection in respect of radio bearers used to provide a service or services of a second category.

The invention also applies to a communications device of a cellular radio system, comprising means for detecting a failure in a radio connection including active radio bearers; it is characterized in that it comprises
  means for determining a first expiry time for a period during which the re-establishment of the lost radio connection in respect of radio bearers used to provide a service or services of a first category is allowable and
  means for determining a second expiry time for a period during which the re-establishment of the lost radio connection in respect of radio bearers used to provide a service or services of a second category is allowable.

The inflexibility of the prior art arrangement comes from the fact that a single re-establishment timer governs the period during which attempts for re-establishment are allowed. According to the invention there are defined separate timers or some higher layer monitoring arrangements for different categories of radio bearers. Examples of such categories are RT and NRT radio bearers, CS (Circuit Switched) domain and PS (Packet Switched) domain radio bearers and radio bearers utilizing acknowledged mode/unacknowledged mode or transparent mode Layer 2 retransmission protocol, or radio bearers serving certain specific service types like e.g. audio, video or e-mail. Also other radio bearer specific or radio access bearer specific or service specific parameters may be used to define the re-establishment category. A re-establishment timer can be defined even for every radio access bearer or even for every radio bearer separately.

According to prior art, one radio access bearer can use one or many radio bearers to implement the (radio access bearer) service. An exemplary service requiring more than one radio bearer is speech utilizing an AMR (Adaptive MultiRate) codec. One way to implement the invention would be to define a pool of re-establishment timers (numbered e.g. as T314, T315, . . . , T3xx), the maximum number of re-establishment timers being equal to the maximum number of radio bearers. At each radio access bearer setup, one of these timers would be assigned to the radio access bearer being setup and optionally a (new) timeout value for this timer would be set, at least if the value is not already set earlier. All the radio bearers (1 to N) belonging to this radio access bearer would then also be associated with this timer. Thus, each radio access bearer (and the radio bearers it is using) could have its own timer, if so desired. On the other hand, one timer could be assigned to many radio access bearers (and the radio bearers they are using). This arrangement would provide the maximum required flexibility for the operator to implement the re-establishment procedure in a radio access network. (The only 'restriction' of this arrangement would be that single radio bearers in one radio access bearer cannot have different re-establishment timer values, but it is not foreseen that it would be necessary to have different re-establishment timer values for different parts of one radio access bearer service).

With higher layer monitoring arrangements we mean that for example speech or video codecs may monitor the error rates occurring in information received over active radio bearers. A sudden surge in error rates means that the radio bearer has most likely been temporarily lost. A counter calculating the number of completely corrupted frames or other discrete information units may take over the duties of a timer so that when the counter reaches a predefined threshold value, the "timer" is regarded to have expired.

The signalling radio bearers (which are not associated to any RAB but to a signalling connections between UE and CN entities) preferably follow the largest re-establishment timer used for the radio access bearers in the user-plane. When the last re-establishment timer in the user plane expires without UE being in "in service" area, also the signalling connection can be (locally) released and the connection is moved to RRC-idle mode. If an RRC connection contains only control-plane entities (signalling radio bearers), which may be the case e.g. during a location update procedure, there are two possibilities—either no re-establishment timer is used or a re-establishment timer needs to be assigned to the signalling radio bearers separately. In the former alternative, the system would rely on the higher layer timers and on that the higher layer using a signalling radio bearer(s) will make a local RRC connection release when its timers expire. In the latter alternative, the re-establishment timer value can be included into some system information message broadcast on BCH or it can be assigned to each UE separately by including the value to some dedicated signalling message which is sent from UTRAN to UE.

A newly introduced arrangement for timing the period of allowed re-establishment of an RRC connection including first type of (e.g. NRT-related) radio bearers may be based on a fixed time period, so that the re-establishment timer always expires after a constant time period after the RRC connection with radio bearers of this type was lost. Another alternative is to utilize the mechanisms that already exist for deciding and even dynamically changing RT connection re-establishment timers: an information element may be added to those messages from the RNC or corresponding control entity to the mobile terminal that in their known form declare the current value for the RT connection re-establishment timer.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
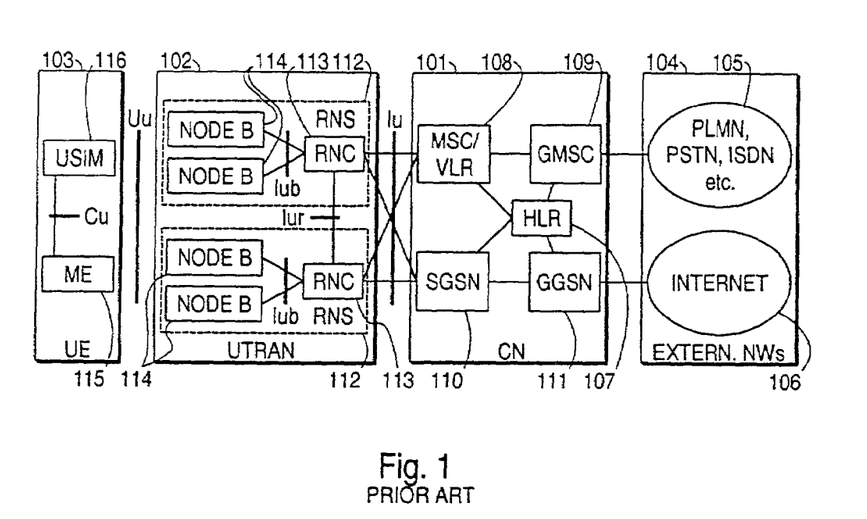
FIG. 1 illustrates a known network architecture.

In order to exemplify the applicability of the invention, certain known features of cellular radio network architectures are discussed referring to FIG. 1. The main parts of a mobile telephone system are a CN (Core Network) 101, a UTRAN (UMTS Terrestrial Radio Access Network) 102 and a UE (user equipment) 103. The CN 101 can be connected to external networks 104, examples of which comprise CS (Circuit Switched) networks 105 (e.g. PLMN, PSTN, ISDN; Public Land Mobile Network, Public Switched Telephone Network, Integrated Services Digital Network) or PS (Packet Switched) networks 106 (e.g. the Internet). The interface between the CN 101 and the UTRAN 102 is called the Iu interface, and the interface between the UTRAN 102 and the UE 103 is called the Uu interface. As shown in FIG. 1, the RNC is typically connected to two CN nodes (MSC/VLR and SGSN; Mobile Services Switching Centre/Visitor Location Register and Serving GPRS Support Node). In some network topologies it may be possible that one RNC is connected only to one CN node or to more than two CN nodes.

The CN 101 is composed of a HLR (Home Location Register) 107, a MSC/VLR 108, a GMSC (Gateway MSC) 109, a SGSN 110 and a GGSN (Gateway GPRS Support Node) 111.

The UTRAN 102 is composed of RNSs (Radio Network Subsystems) 112. The interface between two RNSs is called the Iur interface. Each RNS 112 comprises a RNC 113 and one or more Node Bs 114. The interface between a RNC 113 and a Node B 114 is called the Iub interface.

The RNC 113 is the network element responsible for the control of the radio resources of UTRAN 102. The RNC 113 interfaces the CN 101 (normally to one MSC 108 and one SGSN 110) and also terminates the RRC protocol that defines the messages and procedures between the UE 103 and UTRAN 102. The RNC 113 logically corresponds to the base station controller of the GSM standard.

The main function of the Node B 114 is to perform the air interface L1 (Layer 1) processing, which consists of channel coding and interleaving, rate adaptation, spreading and corresponding functions as is known as such. It also performs some basic RRM (Radio Resource Management) operation such as the inner loop power control. Logically it corresponds to the BTS (Base Transceiver Station) of the GSM standard.

The user equipment UE 103 comprises two parts, which are the ME (Mobile Equipment) 115 and the USIM (UMTS Subscriber Identity Module) 116. The ME is the radio terminal used for radio communication over the Uu interface between the UE 103 and the UTRAN 102. The USIM 116 is a smart card that holds the subscriber identity, performs authentication algorithms, and stores authentication and encryption keys and some subscription information that is needed at the terminal.

In other contexts the radio terminal used for radio communication is known as the mobile station, the mobile terminal, the mobile communications apparatus, the user terminal or something else. The following description uses the term UE for the sake of consistency; it should be noted that the use of terms relating to some specific cellular radio network are exemplary and do not limit the applicability of the invention.

A communication connection between a CN and a UE necessitates a signalling connection and an RAB (Radio Access Bearer) or RABs therebetween. The signalling connection is used to carry control plane signalling messages. The RAB or RABs is/are used to carry the actual user plane services. A communication connection may also contain only a signalling connection (no RAB(s)), if it is used only for a signalling procedure(s), e.g. a location update procedure for a UE with no services active (in idle mode). The part of an RAB which goes over the Iu interface between the CN and the UTRAN is called the Iu bearer and the part which goes over the Uu interface between the UTRAN and the UE is called the RB (Radio Bearer). One RAB may use one or many radio bearers (and Iu bearers). The part of the signalling connection which goes over the Uu interface consists of SRBs (Signalling Radio Bearers), which are a special types of Radio Bearers and may also be called simply 'Radio Bearers'. Thus, if only a 'Radio Bearer' is mentioned, it should be clear that the term may refer both to the user plane and control plane. The connection over the Uu interface, including all the SRBs and RBs, is called a RRC Connection. One UE may naturally have several active RABs (one for each user service) but may also have several signalling connections, e.g. if RRC is connected to two or more CN entities and UE has a connection to each of them. However, only one RRC Connection exists, including all the signalling connections and RABs.

Figure 2A:
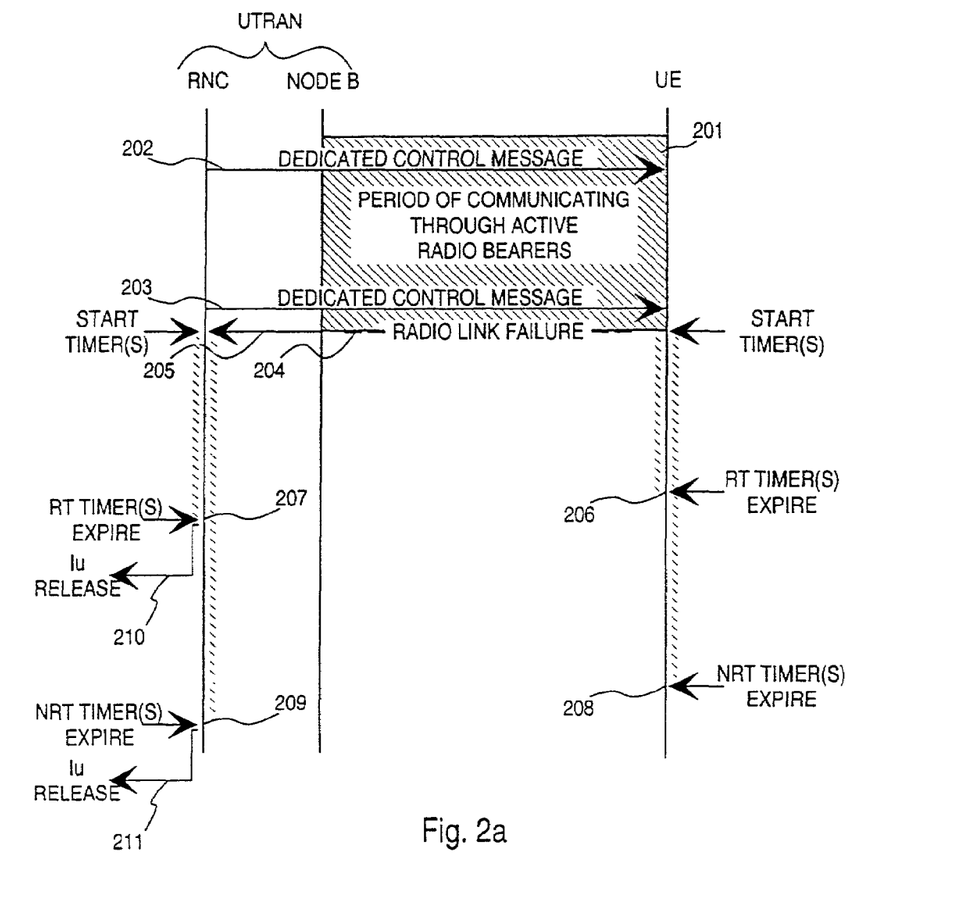
FIG. 2a illustrates a communication situation where an embodiment of the invention is applied.

FIG. 2a illustrates schematically some aspects of communication in a cellular radio system which comprises, in this example a UTRAN and a UE. Time runs from top to down in FIG. 2a. Throughout a period 201 the UE has been communicating with the UTRAN through a set of radio bearers belonging to an RRC connection. For the sake of example we assume that there has been at least one active radio bearer for providing real time services and one active radio bearer for providing non-real time services. At least once during the period 201 the UTRAN has sent to the UE a dedicated control channel message; messages 202 and 203 are shown in FIG. 2a.

At a certain time instant 204 there is a radio link failure which cuts the radio connection between the UE and the UTRAN. When the UE detects that the radio connection has been lost, it starts at least one timer. Also when the UTRAN detects that the radio connection has been lost, it starts at least one timer. One specific way of communicating the information regarding a lost radio connection is shown in FIG. 2a. From Layer 1 (not separately shown) of the Node B to the Layer 3 (not separately shown) of the RNC comes an Iub message 205 which conveys a primitive known as the CPHY-Out-of-Sync-IND. A similar primitive can also be used in the UE to indicate the lost radio connection from Layer 1 to Layer 3 where the actual timers are controlled.

In the embodiment illustrated in FIG. 2a the UE and the UTRAN both start at least two timers: at least one concerning the reestablishment of the radio connection in respect of the RT-related radio bearers and at least one more concerning the re-establishment of the radio connection in respect of the NRT-related radio bearers. We expect that the UE does not find itself to be on an "in service area", because such a finding would initiate the transmission of messages that aim at re-establishing the lost connections. The RT timer(s) in the UE expire at a certain later time instant 206, which is not very much after the time instant 204 which meant the failure of the radio link—as we noted in the description of prior art, typical expiry times for RT re-establishment timers is in the order of seconds. Correspondingly, the RT timer(s) in the RNC expire at a time instant 207, which is slightly later than the time instant 206. The reason for slightly delaying the timer expiration in the RNC is that also such cases must be allowed for where the UE finds itself to be on an "in service area" only a very short moment before the timer(s) in the UE would expire. It takes time for the UE to react, and since the re-establishment of the RRC connection relies on a UE-originating radio transmission which may even undergo a retransmission procedure before successful reception at the UTRAN, it would be operationally unwise if the timer(s) at the RNC would expire simultaneously with the UE timers. A straightforward way to calculate a value for the delay used in the RNC is to multiply the number of allowed re-establishment attempts with the maximum time UE waits for a response message for a re-establishment attempt. These counters and timers are defined in the protocol standards and according to the mentioned prior art documents, the delay would be N301*T301. Simulation and/or experimentation could also be used to find an appropriate value for the delay used in the RNC in relation to the UE.

According to an aspect of the invention, the NRT timer(s) of the UE expire at a certain still later time instant 208, which may be as long as several minutes after the radio link failed. Again after a certain delay, the NRT timer(s) of the RNC expire at time instant 209. In each case the expiration of a timer in the RNC causes an Iu message of the type "RAB-release-request" (or the like) to be sent towards the CN. Such a message initiates the release procedures for that part at the Iu interface which corresponded to the radio bearer in respect of which the timer expired. Messages 210 and 211 are shown in FIG. 2a for the sake of example.

With the conditional plural form "timer(s)" we mean that there may be a single common timer for all RT-related radio bearers and a single common timer for all NRT-related radio bearers, or there may be several timers of one or both of these categories. An extreme case is that every radio bearer has a timer of its own. Such an arrangement would allow very flexible determination of re-establishment procedures according to the specific needs of every active radio bearer, but simultaneously it would considerably increase the needs for signalling between the RNC and the UE.

According to the known arrangements, at least one of the dedicated control channel messages 202 or 203 comprises an information element that tells the UE the expiry time it should use for one timer, typically the RT timer. The invention may expand such definitions so that for example both dedicated control channel messages 202 and 203 comprise enough information elements to declare the applicable expiry times for all timers, or each one of the dedicated control channel messages 202 tells 203 tells the expiry time for one timer.

The selectability of the expiry value for the known re-establishment timer is a consequence of the fact that the prior art timer had to be adaptable to e.g. those cases where there are only NRT-related active radio bearers. In such a case the expiry value could have been made much larger than in those cases where active RT-related radio bearers existed. It should be noted that the invention allows for the known selectable timer to be used for RT-related radio bearers while a completely fixed expiry value could be used for the timer that governs the re-establishment of the radio connection in respect of the NRT-related radio bearers. The latter case would not increase the signalling needs at all in comparison to the existing arrangements.

Not all radio bearers are associated with an explicit indication of whether they are used for RT or NRT communications. However, all radio bearers can be characterised as either using transparent RLC (Radio Link Control) or non-transparent RLC in the form of unack (unacknowledged) or ack (acknowledged) mode RLC. For the purposes of the invention we may define that the radio bearers using transparent or unacknowledged RLC may be regarded as being used for providing RT services and the radio bearers using acknowledged RLC may be regarded as being used for providing NRT services.

As we pointed out above in the summary of the invention, the invention is applicable not only to type sensitive re-establishment timing regarding RT- and NRT-type radio bearers but also to adapting the re-establishment timing according to the circuit or packet switched nature of the connections, or to the different QoS (Quality of Service) characteristics of radio bearers, or to some other feature which is specific to certain radio bearer or radio bearer group. One example of such 'other' feature is the radio access bearer, which may use one or many radio bearers. Thus, a separate re-establishment time can be assigned to each radio access bearer or radio access bearer group. Radio access bearers can be categorized e.g. by the service type or QoS profile they are offering. A separate re-establishment timer can be allocated for each service type (or QoS profile) or for a group of service types, called 'category' of services types in this patent application.

Figure 2B:
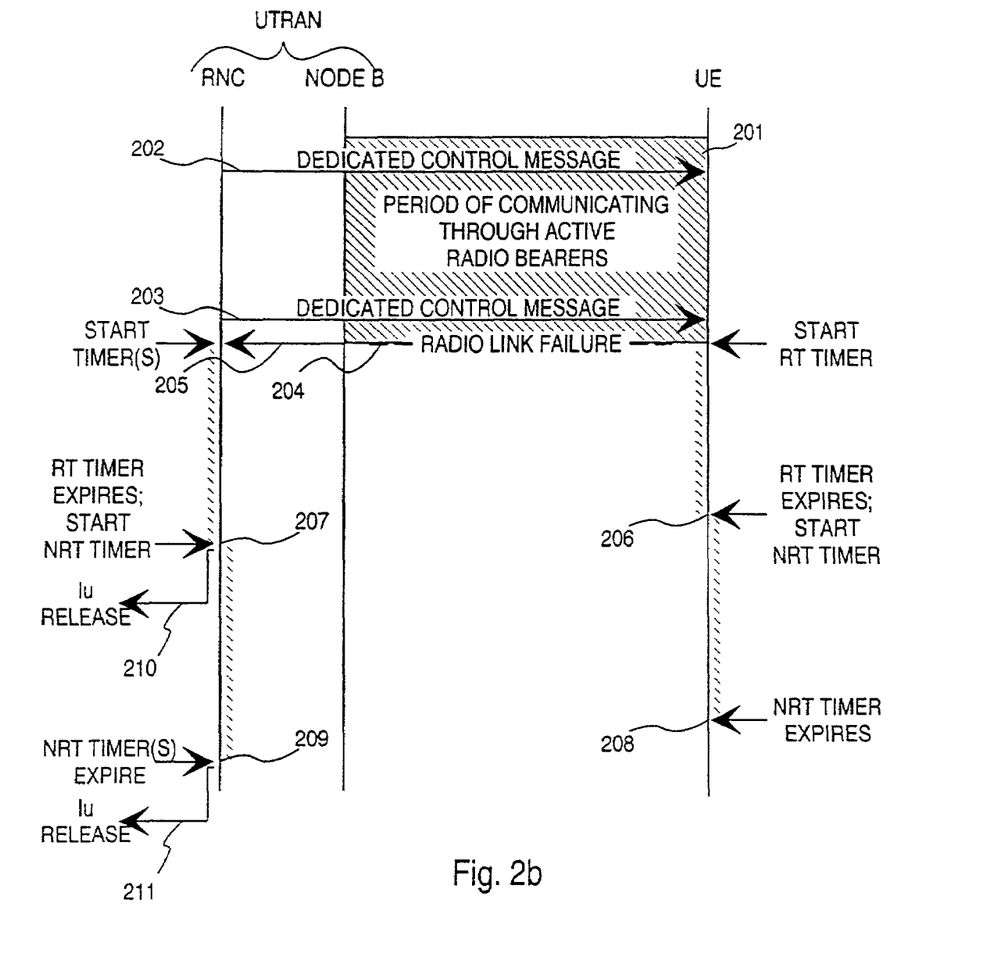
FIG. 2b illustrates a communication situation where another embodiment of the invention is applied.

FIG. 2b illustrates an alternative approach where two re-establishment timers are used, although one of them is still for the RT-related radio bearers and the other for the NRT-related radio bearers. Only the timer for RT-related radio bearers is started at time instant 204 when the radio link failure occurs. At the moment of expiry 206 of the RT timer in the UE the NRT timer is started. The NRT timer of the UE runs from time instant 206 to time instant 208. Correspondingly the NRT timer of the RNC is started at the moment of expiry 207 of the RT timer, and it runs from time instant 207 to time instant 209. The principle of at least partially chaining the timers may naturally be applied regardless of how many timers there are. Partial chaining in a situation where multiple timers exist means that the moment of expiry of one timer is used as the moment of starting at least two other timers. For example all radio bearer specific timers governing the re-establishment of the RRC connection concerning NRT-related radio bearers might start at the moment of expiry of a single timer for RT-related radio bearers.

Figure 3:
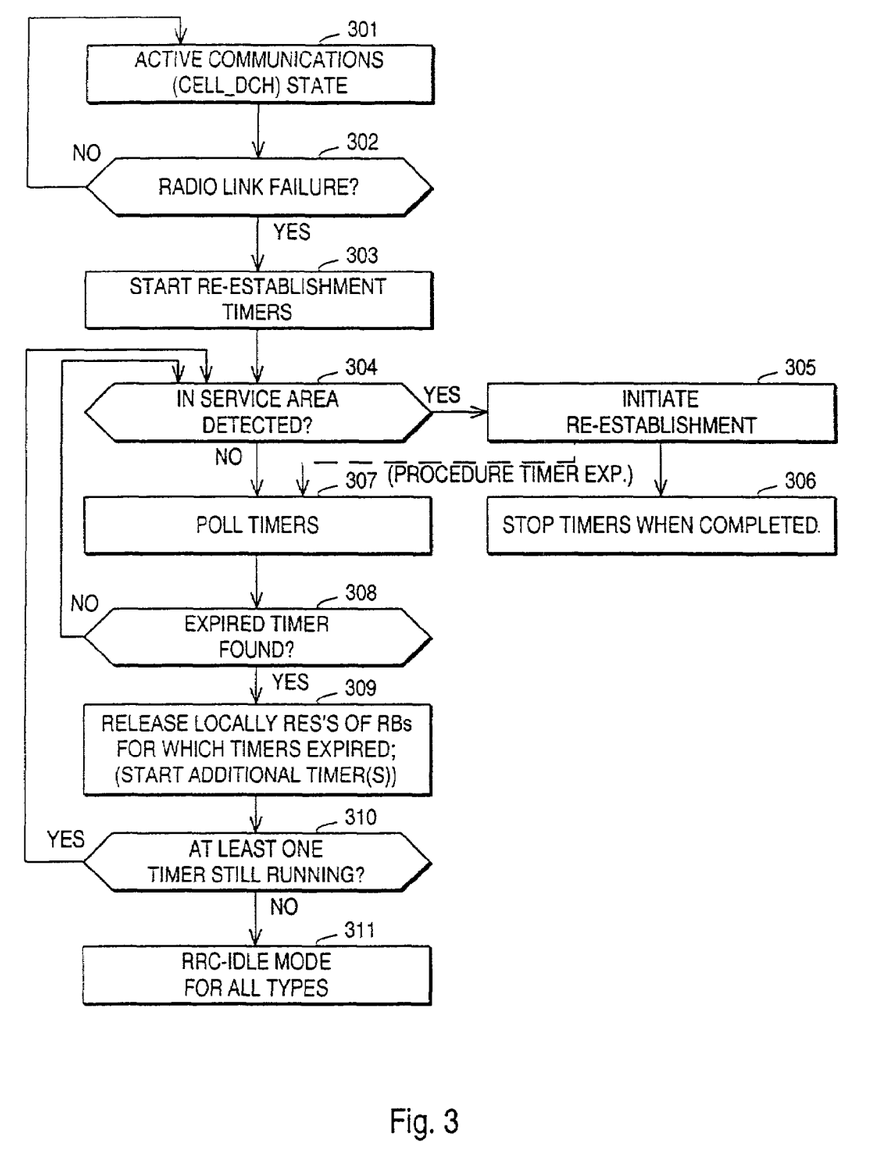
FIG. 3 illustrates a method according to an embodiment of the invention.

FIG. 3 illustrates a method according to an embodiment of the invention for arranging the operation of a UE or an RNC. If a state 301 where active radio bearers exist is interrupted by a detected communication failure at step 302, the re-establishment timers are started at step 303. Step 304 is a check, whether the UE is within an "in-service area"; in the UE this is a straightforward check while in the RNC step 304 means observing whether an RRC connection re-establishment message has been received from the UE. A positive finding at step 304 leads to step 305 where re-establishment of the RRC connection is initiated. After the re-establishment has been completed, the timers are stopped at step 306.

A negative finding at step 304 leads to step 307 where the timers are polled in order to check, whether they are still running. If an expired timer is found at step 308, the UE locally releases resources of those radio bearers for which the timers(s) have expired and possibly sends indication of this partial release to upper protocol layers in UE. At this stage those radio bearers for which the timer(s) have expired have been deleted from the RRC connection. Regarding those radio bearers that still have a running re-establishment timer, the UE is still in the state where re-establishment of the RRC connection is possible. If the principle of chaining the timers as in FIG. 2b is employed, step 309 also comprises the starting of those "extension" timers that use the expired timer as their starting point.

From the viewpoint of the RNC step 309 means locally releasing resources of those radio bearers for which the timers(s) have expired and generating the corresponding RAB release requests.

At step 310 it is checked, whether all timers have expired. If even one timer is still running, the UE or RNC returns to step 304. However, should "in-service area" be detected at this stage, the following initiation of re-establishment at step 305 only concerns the re-establishment of the RRC connection with those radio bearers remaining that still had a re-establishment timer running. After all timers have expired, the UE goes into complete RRC-idle mode at step 311. Regarding the RNC, after all timers have expired it sends to the CN an Iu release request message and waits for an answer from the CN before going into the complete RRC-idle mode. These procedures constitute a part of step 311 in the operation of the RNC.

Above we have not considered a case where re-establishment of the RRC connection concerning at least one radio bearer has been initiated according to step 305 but the re-establishment timer(s) make it to expiry before the re-establishment procedures have been completed; in the description above we assumed that the re-establishment timer(s) are to be stopped only after completion of the re-establishment procedures at step 306. A solution is to have an own timer for the reestablishment procedure; in the following we refer to this timer as the timer T301 or the procedure timer. Timer T301 is started at the moment of initiating re-establishment at step 305. An expiry value for the timer T301 indicates the longest allowable time for attempting re-establishment. If the timer T301 is running, the re-establishment procedure is continued (e.g. the mobile station continues waiting for an answer to the re-establishment request it has sent to the network) even if one or more of the re-establishment timers described above would expire. An eventual successful completion of the re-establishment procedure will then lead to re-establishment regardless of whether the re-establishment timers expired or not. If the timer T301 expires, it means that the current attempt for re-establishment was not successful, in which case there occurs a transition from step 305 to step 307. This eventually occurring transition is shown in FIG. 3 as a dashed line. It causes a polling round through the re-establishment timers to check, whether any of them has expired during the attempted re-establishment which failed.

Figure 4:
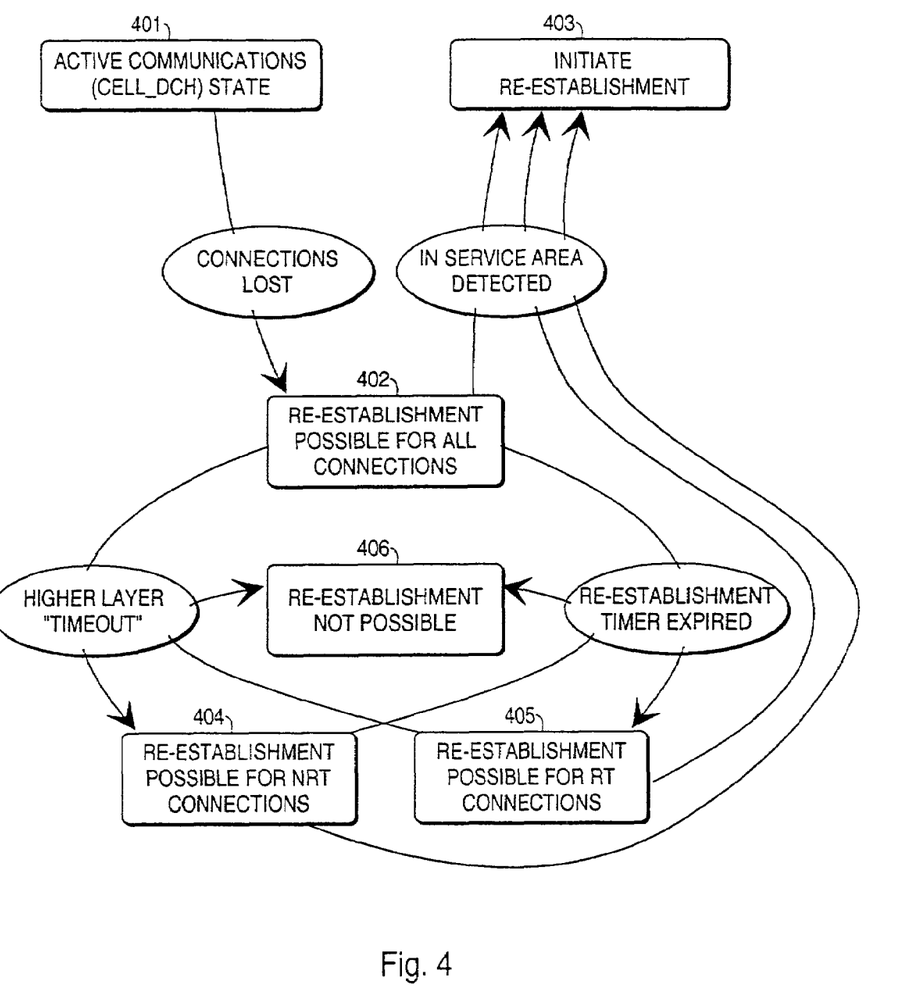
FIG. 4 illustrates a method according to another embodiment of the invention.

FIG. 4 illustrates the operation of a UE or an RNC according to an embodiment of the invention as a state diagram. State 401 is the active communications state which in the 3GPP framework corresponds to the CELL_DCH state. A failure in the radio connection leads to state 402 where initially re-establishing the RRC connection with all of its original radio bearers is possible. If the UE finds itself to be within an "in service area", a transition to state 403 occurs where the re-establishment is initiated. Here again regarding the RNC the detection of the UE being within an "in service area" means that a re-establishment request is received. However, from state 402 also transitions to states 404 and 405 are possible. A transition to state 404 occurs if a higher layer "timeout" indicates that the break has been too long to successfully restore RT-related radio bearers. The term "timeout" is given in quotation marks since the higher layer indication may be based on other measurements than directly time: for example a counter may count the number of frames or other discrete information units that have passed since the failure in communications was detected. From state 404 there are two possible transitions: either to the complete RRC-idle state 406 if the timer for re-establishing NRT connections makes it to the expiry before "in service area" is detected, or to the previously mentioned RRC connection re-establishment state 403 if the opposite is true. If a transition from state 404 to state 403 occurs, one must note that the re-established RRC connection can only include those (NRT-related) radio beares for which the re-establishment timer had not expired.

A transition from state 402 to state 405 occurs if, for some reason, the timer for re-establishing the RRC connection in respect of the NRT-related radio bearers expires before said higher-layer "timeout". After that, there comes a transition either to the complete RRC-idle state 406 if the higher-layer "timeout" occurs before "in service area" is detected, or to the previously mentioned RRC connection re-establishment state 403 if the opposite is true. Again if a transition to state 403 occurs, one must note that the re-established RRC connection can only include those (RT-related) radio beares for which the higher-layer "timeout" had not expired.

Figure 5:
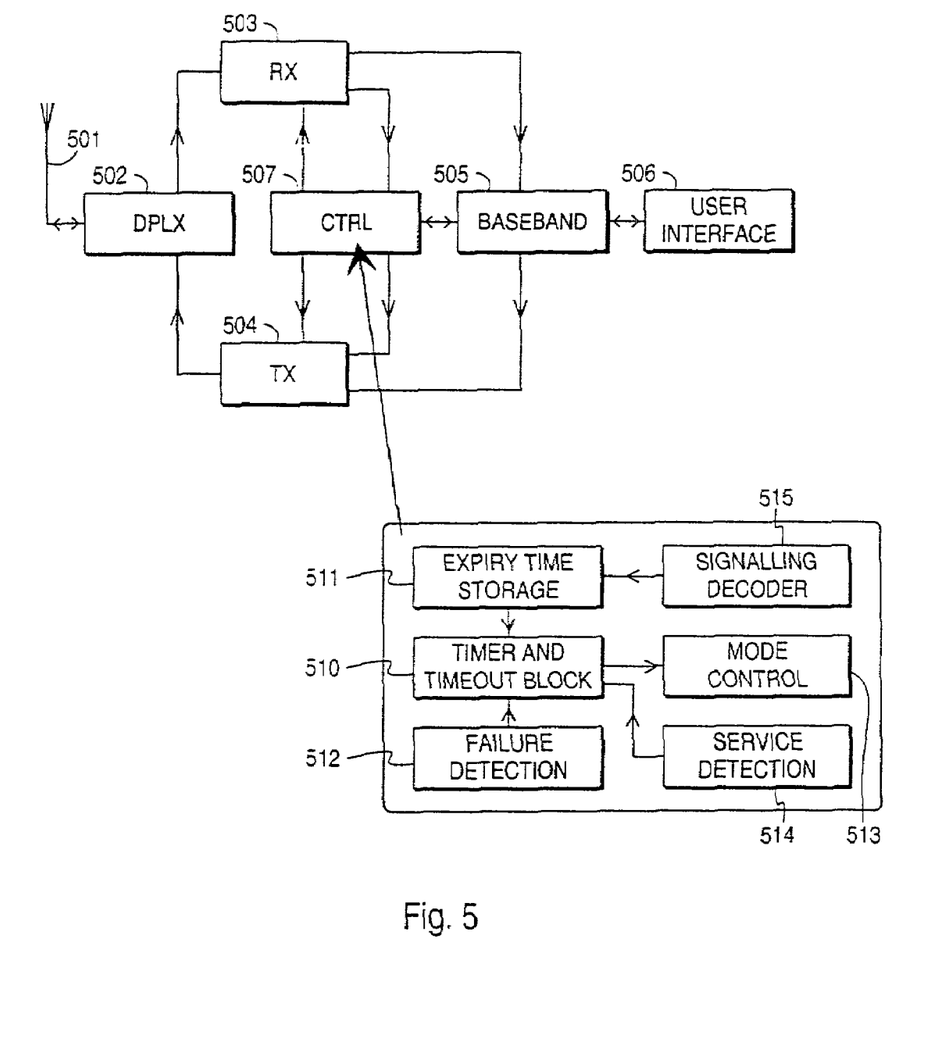
FIG. 5 illustrates a mobile terminal according to an embodiment of the invention and FIG. 6 illustrates a radio network controller according to an embodiment of the invention.

FIG. 5 illustrates schematically certain parts of a UE according to an embodiment of the invention. An antenna 501 is coupled through a duplexing block 502 to a receiver block 503 and a transmitter block 504. The sink of payload data from the receiver block 503 and the source of payload data to the transmitter block 504 is a baseband block 505 which in turn is coupled to a user interface block 506 for communicating with a human or electronic user. A control block 507 receives control information from the receiver block 503 and transmits control information through the transmitter block 504. Additionally the control block 507 controls the operation of the blocks 503, 504 and 505.

In accordance with the invention, the control block 507 comprises a timer and timeout block 510 where the required timers and higher layer timeout detectors are implemented. The timer and timeout block 510 obtains the currently applicable expiry values from an expiry value storage 511, starts the timers and timeout detectors as a response to a signal coming from a failure detection block 512 and provides a mode control block 513 with information about whether or not the timers and timeout detectors have expired. The timer and timeout block 510 is also arranged to respond to a signal from a service detection block 513 by stopping any running timers and timeout detectors. The expiry value storage 511 is typically coupled to a signalling detector 514 for receiving currently applicable expiry values from the network in signalling messages. For the potential purpose of determining fixed, relatively long expiry times for the re-establishment of RRC connections with remaining NRT-related radio bearers the expiry value storage 511 may also comprise, stored therein, a fixed expiry time value or a number of fixed expiry time values.

Figure 6:
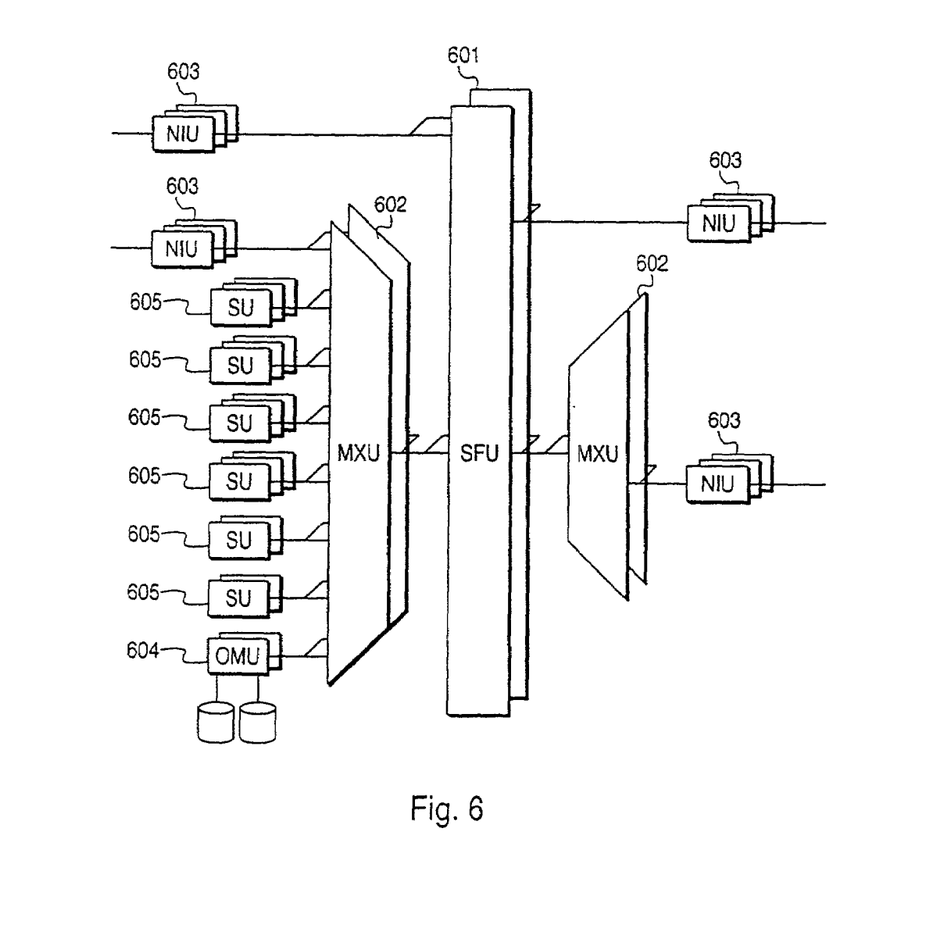

FIG. 6 defines a functional structure of a typical RNC of a cellular radio network, more exactly of a UMTS radio network utilizing WCDMA. The invention must naturally not be considered to be limited thereto. The invention can also be used in other types of cellular radio networks.

The RNC of FIG. 6 comprises a SFU (Switching Fabric Unit) 601 to which several control processor units can be connected. Reliability is typically enhanced by providing hardware level redundancy in the form of parallel redundant units. MXUs (Multiplexing Units) 602 can be used between a number of processor units and the SFU 601 to map the low bitrates from the processor units into the high bitrates of the SFU input ports. The NIUs (Network Interface Units) 603 handle the physical layer connection to different interfaces (e.g. Iub interface towards Node B:s, Iur interface towards other RNCs, Iu interface towards core network nodes). The OMU (Operations and Maintenance Unit) 604 contains the RNC configuration and fault information and can be accessed from an external operations and maintenance center. The SUs (Signalling Units) 605 implement all the control and user plane protocols required in the RNC. Thus, the invention can be implemented in RNC in the Signalling Units by providing therein the timers and their control functions in a manner analogous to that described above in association with FIG. 5.

There are certain known cellular radio networks that comprise means for communicating to a terminal the value of an expiry time for a period during which the re-establishment of a lost radio connection is allowable. Taken the disclosure of the present patent application, it is within the capabilities of a person skilled in the art to add into such cellular radio networks the feature of communicating to a terminal the value of another expiry time, in which case the terminal may use one of the communicated expiry time values for calculating the period during which the re-establishment of a lost radio connection in respect of radio bearers used to provide real time services is allowable and the other one of the communicated expiry time values for calculating the period during which the re-establishment of a lost radio connection in respect of radio bearers used to provide non-real time services is allowable.

The use of words or concepts in this patent application that are fixed terms in the specifications of some existing cellular radio networks should not be construed as a limitation to the applicability of invention. The features disclosed in depending claims are combinable with each other unless explicitly otherwise stated.

The invention claimed is:

1. A method for determining an expiry time for a period during which a re-establishment of a lost radio connection between a mobile station and a network node of a cellular network is allowable, said radio connection having a plurality of active radio bearers belonging to a radio resource control connection, said method comprising:
   determining a first expiry time for a period during which the re-establishment of the lost radio connection in respect of said radio bearers that are used to provide a service or services of a first category is allowable,
   determining a second expiry time for a period during which the re-establishment of the lost radio, connection in respect of said radio bearers used to provide a service or services of a second category is allowable; wherein
   said second category of service is different than said first category of service, and said second expiry time is different than said first expiry time; and wherein
   the mobile station and said network node attempt to re-establish the lost radio connection before the first expiry time in respect of a radio bearer used to provide a service or services of the first category or before the second expiry time in respect of a radio bearer used to provide a service or services of the second category.

2. A method according to claim 1, wherein determining a first expiry time comprises receiving, in a mobile station of a cellular radio network, a value of said first expiry time from a network node of said cellular radio network in a control message, and determining a second expiry time comprises receiving a value of said second expiry time from said network node in the same control message.

3. A method according to claim 1, wherein determining a first expiry time comprises receiving, in a mobile station of a cellular radio network, a value of said first expiry time from a network node of said cellular radio network in a first control message, and determining a second expiry time comprises receiving a value of said second expiry time from said network node in a second control message which is different than said first control message.

4. A method according to claim 1, wherein determining a first expiry time comprises receiving, in a mobile station of a cellular radio network, a value of said first expiry time from a network node of said cellular radio network in a control message, and determining a second expiry time comprises reading a fixed value for said second expiry time from a memory.

5. A method according to claim 1, wherein determining a first expiry time comprises determining said first expiry time as a duration of time from a moment of detecting the lost radio connection to a moment after which re-establishing the lost radio connection in respect of radio bearers used to provide a service or services of said first category is not any more allowable, and determining a second expiry time comprises determining said second expiry time as the duration of time from the moment of detecting the lost radio connection to a moment after which re-establishing the lost radio connection in respect of radio bearers used to provide a service or services of said second category is not any more allowable.

6. A method according to claim 1, wherein determining a first expiry time comprises determining said first expiry time as a duration of time from a moment of detecting the lost radio connection to a moment after which re-establishing the lost radio connection in respect of radio bearers used to provide a service or services of said first category is not any more allowable, and determining a second expiry time comprises determining said second expiry time as the duration of time from the moment after which re-establishing the lost radio connection in respect of radio bearers used to provide a service or services of said first category is not any more allowable to a moment after which re- establishing the lost radio connection in respect of radio bearers used to provide a service or services of said second category is not any more allowable.

7. A method according to claim 1, further comprising:
   determining a number of expiry times, each expiry time concerning a period during which the re-establishment of the lost radio connection in respect of radio bearers used to provide a service or services of one of a number of categories is allowable, wherein said number is greater than two.

8. A method for responding to a situation where a mobile station of a cellular radio network detects a failure in a radio connection between itself and a network node of the cellular radio network, said radio connection having a plurality of active radio bearers belonging to a radio resource control connection, said method comprising:
   a) starting a first timer,
   b) checking, whether the mobile station is within an in service area,
   c) as a response to the mobile station being within an in service area, initiating a re-establishment of the radio connection,
   a') starting a second timer,
   d') as a response to the first timer reaching a first expiry value without the mobile station finding itself to be within an in service area, disabling the re-establishment of the radio connection in respect of said radio bearers which are used to provide a service or services of a first category and
   d") as a response to said second timer reaching a second expiry value without the mobile station finding itself to be within an in service area, disabling the re-establishment of the radio connection in respect of said radio bearers which are used to provide a service or services of a second category;
   wherein said second category of services is different than said first category of services, and said second expiry value is different than said first expiry value.

9. A method according to claim 8 further comprising:
   as a response to completing the re-establishment of the radio connection initiated at step c), stopping those of the first and second timers that have not expired.

10. A method according to claim 8 further comprising:
    as a response to an indication of failure of the re-establishment of the radio connection initiated at step c), checking whether any of said first and second timers have reached their expiry values, and after said checking;
    d''') as a response to a finding indicating that said first timer has reached a first expiry value, disabling the re-establishment of the radio connection in respect of said radio bearers used to provide a service or services of a first category; and
    d'''') as a response to a finding indicating that said second timer has reached a second expiry value, disabling the re-establishment of the radio connection in respect of said radio bearers used to provide a service or services of a second category.

11. A method according to claim 8 further comprising:
    as a response to both of the first and second timers having expired without the mobile station finding itself to be within an in service area, locally releasing all radio resources allocated for the failed radio connection.

12. A method according to claim 8, wherein starting a second timer coincides with starting the first timer.

13. A method according to claim 8, wherein starting a second timer coincides with a moment of the first timer reaching a first expiry value.

14. A method for responding to a situation where a network node of a cellular radio network detects a failure in a radio connection between itself and a mobile station of the cellular radio network, said radio connection having a plurality of active radio bearers belonging to a radio resource control connection, the method comprising:
    a) starting a first timer,
    b) checking, whether a connection re-establishment request has been received from the mobile station,
    c) as a response to a connection re-establishment request having been received from the mobile station, initiating a re-establishment of the radio connection,
    a') starting a second timer,
    d') as a response to the first timer reaching a first expiry value without a connection re-establishment request having been received from the mobile station, disabling the re-establishment of the radio connection in respect of radio bearers that are used to provide a service or services of a first category; and
    d") as a response to said second timer reaching a second expiry value without a connection re-establishment request having been received from the mobile station, disabling the re-establishment of the radio connection in respect of said radio bearers that are used to provide a service or services of a second category;
    wherein said second category of services is different than said first category of services, and said second expiry value is different than said first expiry value.

15. A method according to claim 14 further comprising:
    as a response to completing the re-establishment of the radio connection initiated at step c), stopping those of the first and second timers that have not expired.

16. A method according to claim 14 further comprising:
    as a response to both of the first and second timers having expired without a connection re-establishment request having been received from the mobile station, locally releasing all communication resources allocated for a communication connection of which the failed radio connection constituted a part.

17. A communications device of a cellular radio system, comprising:
    means for detecting a failure in a radio connection, said radio connection having a plurality of active radio bearers belonging to a radio resource control connection;
    means for determining a first expiry time for a period during which a re-establishment of a lost radio connection in respect of said radio bearers that are used to provide a service or services of a first category is allowable; and
    means for determining a second expiry time for a period during which the re-establishment of the lost radio connection in respect of said radio bearers that are used to provide a service or services of a second category is allowable; and
    wherein said second category of services is different than said first category of services, and said second expiry value is different than said first expiry value.

18. A communications device according to claim 17, wherein it is a terminal of the cellular radio system and said means for determining a first expiry time comprise means for receiving a value of said first expiry time from a network node of a cellular radio network in a control message, and said means for determining a second expiry time comprise means for receiving a value of said second expiry time I from said network node of a cellular radio network in a control message.

19. A communications device according to claim 17, wherein it is a terminal of the cellular radio system and said means for determining a first expiry time comprise means for receiving a value of said first expiry time from the base station I of a cellular radio network in a control message, and said means for determining a second expiry time comprise means for reading a previously stored constant second expiry time from a memory.

20. A communications device according to claim 17, wherein it is a network node of a cellular radio network for providing communication connections including radio bearers to terminals and it comprises:
   means for communicating to a terminal a value of a first expiry time for a period during which the re-establishment of a lost radio connection in respect of said radio bearers that are used to provide a service or services of a first category is allowable; and
   means for communicating to a terminal a second expiry time for a period during which the re-establishment of a lost radio connection in respect of said radio bearers that are used to provide a service or services of a second category is allowable.

21. A method comprising:
   determining a first expiry time for a period during which a re-establishment of a lost radio connection is allowable in respect of radio bearers used to provide a service or services of a first category, said radio connection having a plurality of active radio bearers belonging to a radio resource control connection;
   determining a second expiry time for a period during which the re-establishment of the lost radio connection is allowable in respect of said radio bearers that are used to provide a service or services of a second category; and
   transmitting a re-establishing attempt message before the first expiry time in respect of a radio bearer used to provide a service or services of the first category or before the second expiry time in respect of a radio bearer used to provide a service or services of the second category;
   wherein said second category of services is different than said first category of services, and said second expiry time is different than said first expiry time.

22. The method according to claim 21, wherein determining a first expiry time further comprises receiving in a mobile station of a cellular radio network, a value of the first expiry time from a network node of the cellular radio network in a control message, and determining a second expiry time comprises receiving a value of the second expiry time from the network node in the same control message.

23. A method comprising:
   starting a first timer when a mobile station of a cellular radio network detects a failure in a radio connection between itself and a network node of the cellular radio network, said radio connection having a plurality of active radio bearers belonging to a radio resource control connection;
   checking whether the mobile station is within a service area;
   starting a second timer if the mobile station is within the service area,
   transmitting a re-establishing attempt message as an attempt for re-establishment of a radio connection in respect of at least one of a radio bearer used to provide a service or services of a first category or a radio bearer used to provide a service or services of a second category, if the mobile station is within the service area;
   disabling a re-establishment of the radio connection in respect of radio bearers used to provide a service or services of a first category if the first timer reaches a first expiry value without the mobile station being within the service area;
   disabling the re-establishment of the radio connection in respect of radio bearers used to provide a service or services of a second category if the second timer reaches a second expiry value without the mobile station being within the service area;
   wherein said second category of services is different than said first category of services, and said second expiry value is different than said first expiry value.

24. The method of claim 23 further comprising initiating a re-establishment of the radio connection if the mobile station is within the service area and stopping those of the first and second timers that have not expired.

25. The method of claim 23 further comprising locally releasing all radio resources allocated for the failed radio connection if both the first timer and the second timer expire without the mobile station being in a service area.

26. A method, comprising:
   detecting a failure in a radio connection between a network node and a mobile station of a cellular radio network, said radio connection having a plurality of active radio bearers belonging to a radio resource control connection;
   starting a first timer;
   checking whether a connection re-establishment request has been received from the mobile station;
   initiating a re-establishment of the radio connection as a response to a connection re-establishment request having been received from the mobile station;
   starting a second timer;
   disabling the re-establishment of the radio connection in respect of radio bearers used to provide a service or services of a first category if the first timer reaches a first expiry value without a connection re-establishment request having been received from the mobile station; and
   disabling the re-establishment of the radio connection in respect of radio bearers used to provide a service or services of a second category as a response to the second timer reaching a second expiry value without a connection re-establishment request having been received from the mobile station;
   wherein said second category of services is different than said first category of services, and said second expiry value is different than said first expiry value.

27. The method of claim 26 further comprising locally releasing all radio resources allocated for the failed radio connection if both the first timer and the second timer expire without the mobile station being in a service area.

* * * * *